Figure 1:
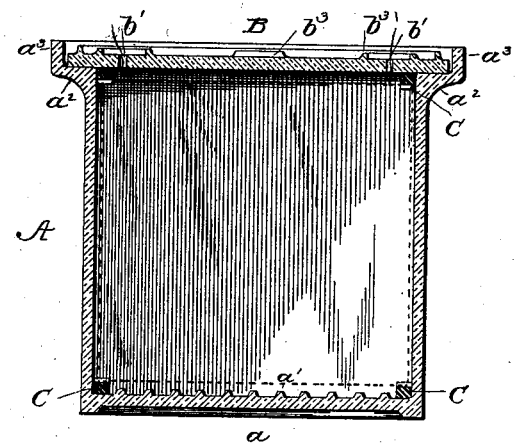

(No Model.)

S. L. TRIPPE.
CELL FOR ELECTRIC BATTERIES.

No. 389,676.  Patented Sept. 18, 1888.

Witnesses:

Inventor:
Sylvanus L. Trippe,
by R. S. Dyrenforth,
his Attorney.

UNITED STATES PATENT OFFICE.

SYLVANUS L. TRIPPE, OF ST. LOUIS, MISSOURI.

CELL FOR ELECTRIC BATTERIES.

SPECIFICATION forming part of Letters Patent No. 389,676, dated September 18, 1888.

Application filed June 10, 1887. Serial No. 240,934. (No model.)

*To all whom it may concern:*

Be it known that I, SYLVANUS L. TRIPPE, a citizen of the United States, residing at St. Louis, in the State of Missouri, have invented certain new and useful Improvements in Cells for Electric Batteries; and I do hereby declare the following to be a full, clear, and exact description of the invention, such as will enable others skilled in the art to which it appertains to make and use the same.

This invention relates to electric batteries.

The object of the invention is to construct a cell for electric batteries which shall be durable and efficient in use, and in which, when employed as a secondary or storage battery, loss by leakage of electricity, as from "creepage" or other cause, will be obviated.

The invention consists in a cell having a ribbed or corrugated bottom, whereby the cell will be strengthened, and whereby also any deposit in the action of the battery may drop out of contact with the electrodes.

The invention also consists in the combination, with a glass or other suitable receptacle for an electric cell, of a frame serving to support the electrodes.

The invention also consists in a cell constructed of glass, porcelain, or other suitable insulating or insulated substance, having a lid capable of perfect closure, whereby the cell may be hermetically sealed and its contents insulated, thus effecting what may be termed "hermetic insulation."

The invention also consists in a receptacle of glass, porcelain, or other suitable insulating or insulated substance, having a recess at the top to hold a suitable lid of similar substance, and provided with perforations, the receptacle having a ribbed or corrugated bottom.

The invention also consists in a receptacle of glass, porcelain, or other suitable insulating or insulated substance, having a recess at the top to hold a suitable lid of similar substance, provided with perforations, and with an upwardly-projecting flange within the outer rim.

The invention also consists in a receptacle of glass, porcelain, or other insulating or insulated substance, having a recess at the top to hold a suitable lid, and a lid of similar substance provided with depressed or cup-shaped perforations.

The invention consists, finally, in a receptacle of porcelain, glass, or other suitable insulating or insulated substance, provided with a lid having a flange within the outer margin, and with cup-shaped perforations.

In the accompanying drawings, forming part of this specification, and in which like letters of reference indicate corresponding parts, I have illustrated a cell, showing examples of embodiment of various features of my invention.

Figure 2:
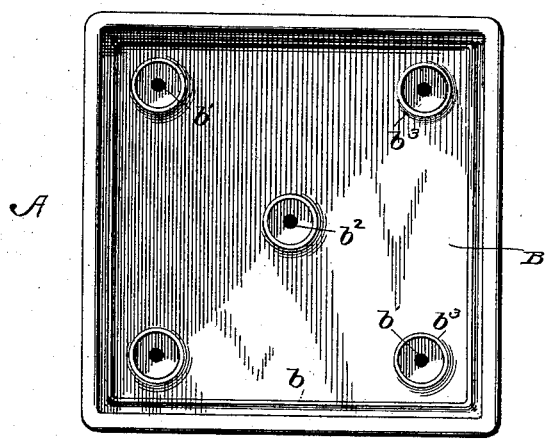

Figure 1 represents a vertical sectional view of a cell constructed in accordance with my invention. Fig. 2 represents a plan view of the same.

In electric batteries heretofore, especially where these have been made of some frangible substance, loss has frequently been experienced from breakage of a cell, and as these cells are most frequently liable to breakage at the bottom, inasmuch as it is at that part that they are most liable to violent concussion, they have at this part been made thicker, or have been re-enforced. Thickening of the bottom, however, renders the cell more liable to breakage from unequal expansion and contraction in cases of change of temperature, while any additional re-enforcement is generally cumbersome and expensive. In the present case it is proposed to strengthen the bottom without materially increasing the usual thickness thereof, by supplying the bottom with a series of ribs or corrugations upon its upper side, and formed integral therewith.

By ribbing or corrugating the bottom an additional advantage is gained, in that recesses or pockets are presented, which serve to receive and retain any sediment that may be deposited in the action of the battery and hold such sediment out of contact with the electrodes, which may then rest directly upon the bottom. Where sediment is allowed to surround or remain in contact with the electrodes it is apt to present a conductor directly from one electrode to the other, thus short-circuiting the battery within itself and detracting from its external effect.

As above said, the electrodes may be permitted to rest directly upon the bottom of the cell; but where it is desired further to remove them from danger of contact with any sediments and where it is desired to fix them within the receptacle against lateral or other motion, so that they may be relieved from any strain and liability to breakage at their point of connection with their cups or wires, or from liability to break the retaining-vessel, racks are provided and placed within the receptacle in such manner as to hold the electrodes in a fixed position. These racks consist, by preference, of one or more pieces of insulated material, provided with notches, into which the ends of the electrodes above and below are set.

It is well known that secondary or so-called "storage" batteries, even when not in use, become continually weaker until they finally have lost all apparent effect—that is, that they gradually lose electrical energy. This loss of electrical energy I attribute to leakage of electricity, and believe that the same is caused by conduction of electricity from the cell by moisture, which, even when present upon the surface of a substance of high resistance—that is, upon a so-called "insulating" substance—presents a conductor superior to the insulating substance when dry, so that there is what may be termed creepage of the current upon the same. The indication, therefore, is as effectively as possible to insulate the contents of the battery, and herein, broadly, is asserted invention. In insulating the contents of the battery where the same is sealed some substance should be chosen which, while at once adequately serving for purposes of insulation, will present non-hygroscopic or water-repellent characteristics, so that even though the substance be in itself of high resistance to the passage of a current of electricity, electricity may not more readily be conveyed over its surface by the presence there of moisture.

Though there are other substances which may serve the purpose I have found paraffine to answer well. With this substance I carefully seal any opening in the battery or other parts which have been closed, forming what may be termed an "electric capsule," and I prefer that the paraffine should be melted when first applied.

As a convenient means for carrying the invention into effect, I take a receptacle of glass, porcelain, or other suitable insulating or insulated substance, having a recess at the top and a lid which rests within the recess and is provided with perforations, and, after the plates have been placed in position and their wires protrude through the perforations in the lid, I fill in the recess over the lid with melted paraffine, and where a secondary battery of this kind is employed, as the same is likely to be particularly heavy, I find it of additional advantage to have the same provided with the described ribbed or corrugated bottom. The battery may be more easily and, perhaps, more effectively sealed and insulated by providing the lid with an upwardly-projecting flange at a short distance from its rim, and making the perforations through the lid, and through which they are to pass, cup-shaped, when it will only be necessary to place the paraffine between the flange and the outer edge of the jar recess and in the cup-shaped perforations around the projecting wires; but either the provision of the flange or of the cup-shaping of the perforations of the lid would fall within the spirit of my invention, the point of which is to seal and insulate the contents of a battery in such manner as to prevent loss of electrical energy.

The jar A is here shown of rectangular form; but it may be of any preferred design, the bottom $a$ of which is provided with a series of ribs or corrugations, $a'$, formed upon its upper surface, and which extend parallel to each other across the jar from side to side. Upon these ribs the electrodes may rest when not suspended within the cell, the recesses or pockets between the ribs forming receptacles for the deposit of sediment occurring through action of the battery, thus removing it from contact with the electrodes and preventing the possibility of the battery being short-circuited within itself. The upper edge of the jar is provided with a shoulder, $a^2$, and an upwardly-projecting flange, $a^3$, at the outer edge of the shoulder, which form a recess upon which rests a lid, B; but the lid may be screw-seated or otherwise fitted within or on the jar. The lid is also made of glass and is of proper shape to fit snugly upon the shoulder upon the upper edge of the jar. A rim or upwardly-projecting flange, $b$, is formed upon the upper surface of the lid at a short distance from its edge and entirely surrounds it, which, together with the outer flange, forms a receptacle in which paraffine or other non-conducting water-repellent substance may be placed hermetically to insulate the cell. The cover is also provided with openings $b'$, located in convenient positions for the purpose of attaching a wire from which the plates may be suspended. An opening, $b^2$, is also provided in the cover to permit the escape of gas while the battery is being charged.

Upon the upper surface of the cover, and surrounding each of the openings $b'$ $b^2$, is formed a ridge or rim, $b^3$, so placed to provide a seat or basin into which the paraffine or other suitable substance may be placed in order effectually to seal the openings, and thus prevent any possibility of leakage.

When the paraffine or other suitable substance has been placed around the edge of the cell and in the basin or opening in the lid, the cell will be hermetically insulated, and all possibility of creepage of the fluid is obviated. Within the cell are also provided rests or racks C, made of any suitable non-conducting material—such as vulcanized rubber—these rests or racks being placed parallel with the ribs upon its bottom, one pair of which is placed upon the bottom of the cell at opposite sides thereof, and another pair being attached to the under side of the lid, and which are adapted to hold the plates above the bottom of the cell when suspended from the lid, and thus relieve the wire to which they are attached from considerable strain.

Having fully described my invention, what I claim as new, and desire to secure by Letters Patent, is—

1. As a new article of manufacture, a vessel for an electric battery, having a corrugated bottom and a rest for a lid within its upper part, substantially as and for the purpose described.

2. As a new article of manufacture, a glass, porcelain, or other suitable vessel for an electric battery, having its bottom corrugated, and having a lid adapted to be set down and rest within the vessel, for the purpose set forth.

3. A receptacle of glass, porcelain, or other suitable insulating or insulated substance, having a recess at its top to hold a suitable lid of similar substance, provided with perforations, and with an upwardly-projecting flange within its outer rim, the whole to be hermetically sealed, substantially as set forth.

4. A receptacle of glass, porcelain, or other suitable insulating or insulated substance, having a recess at the top to hold a suitable lid, and a lid of similar substance, provided with depressed or cup-shaped perforations, substantially as shown and described.

5. A receptacle of porcelain, glass, or other suitable insulating or insulated substance, provided with a lid having a flange within the outer margin, and with cup-shaped perforations, substantially as and for the purpose set forth.

6. A glass or other suitable vessel for an electric battery having a corrugated bottom, in combination with a frame to hold up the electrodes on the corrugations, substantially as described.

7. As a new article of manufacture, a cell comprising a vessel having a corrugated bottom and a recessed top, a frame and electrodes supported thereby, and a perforated lid, substantially as set forth.

In testimony whereof I affix my signature in presence of two witnesses.

SYLVANUS L. TRIPPE.

Witnesses:
R. G. DYRENFORTH,
W. W. MORTIMER.